United States Patent [19]
Blitshteyn et al.

[11] Patent Number: 5,426,557
[45] Date of Patent: Jun. 20, 1995

[54] METHOD OF CONTROLLING HIGH-FREQUENCY ARC DISCHARGE AND APPARATUS FOR TREATMENT OF OUTER SURFACES OF MOLDED POLYMER PARTS WITH ELECTRICAL DISCHARGE

[75] Inventors: Mark Blitshteyn, Bloomingdale; Reinhard Gaenzle, Schaumburg; Richard Wright, Hanover Park, all of Ill.

[73] Assignee: Trans Tech America, Carol Stream, Ill.

[21] Appl. No.: 210,900

[22] Filed: Mar. 18, 1994

[51] Int. Cl.[6] .............................................. H01T 19/00
[52] U.S. Cl. .................................... 361/225; 361/220
[58] Field of Search ............... 361/212, 220, 225, 230, 361/213, 214, 229

[56] References Cited
U.S. PATENT DOCUMENTS

| | | | |
|---|---|---|---|
| 3,733,038 | 5/1973 | Ikrath et al. | 361/212 |
| 4,392,179 | 7/1983 | Nelson et al. | 361/234 |
| 4,724,508 | 2/1988 | Macy | 361/225 |
| 5,146,280 | 9/1992 | Kisu | 361/225 |
| 5,293,200 | 3/1994 | Tsusaka | 361/225 |

*Primary Examiner*—Jeffrey A. Gaffin
*Attorney, Agent, or Firm*—Leydig, Voit & Mayer, Ltd.

[57] ABSTRACT

An apparatus for treating the surfaces of formed plastic articles including a plurality of bare metal discharge electrodes connected to a high frequency AC power supply, a counterelectrode disposed in spaced relation to the discharge electrodes for defining a treatment zone therebetween, and an insulation layer mounted in spaced relation to the counterelectrode such that a discreet air space exists between the insulation and counterelectrode for moderating the electrical discharge between the discharge electrodes and counterelectrode and enabling greater control and uniformity in the electrical discharge between the electrodes and counterelectrodes. In the illustrated the embodiment, a first set of discharge electrodes define a first treatment zone for treating one-half of the circumferential surface of articles directed through the first treatment zone and a second set of discharge electrodes define a second treatment zone for an treating opposite peripheral half of the circumferential surface of articles passing through the second treatment zone.

20 Claims, 2 Drawing Sheets

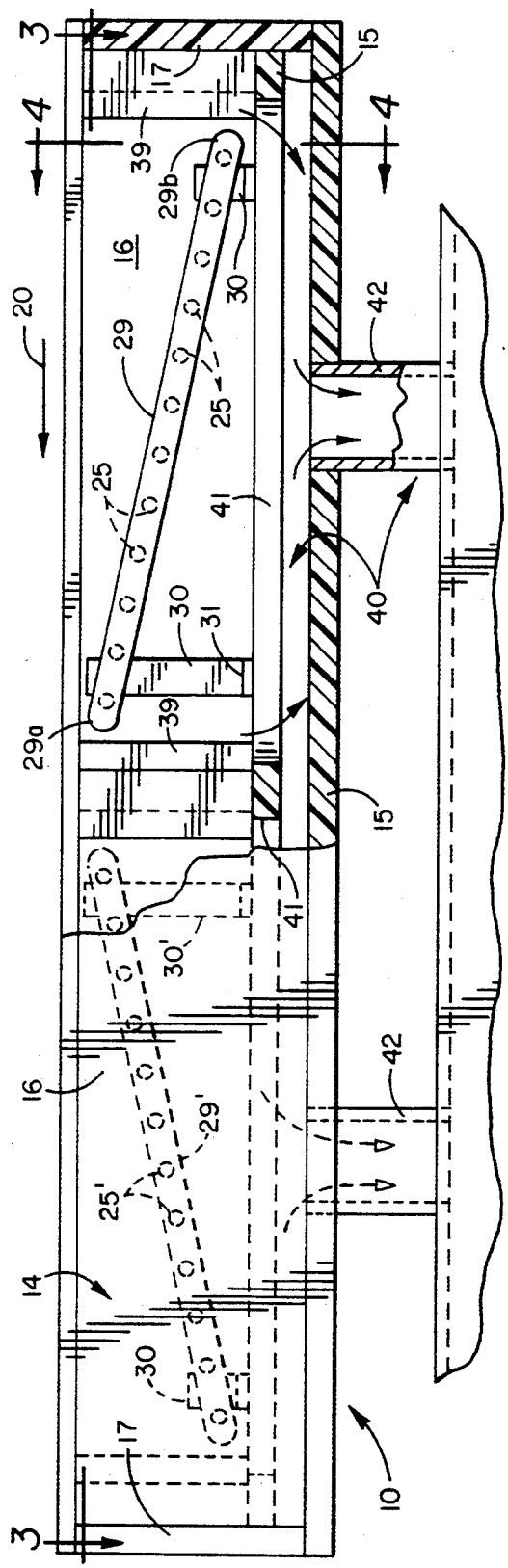
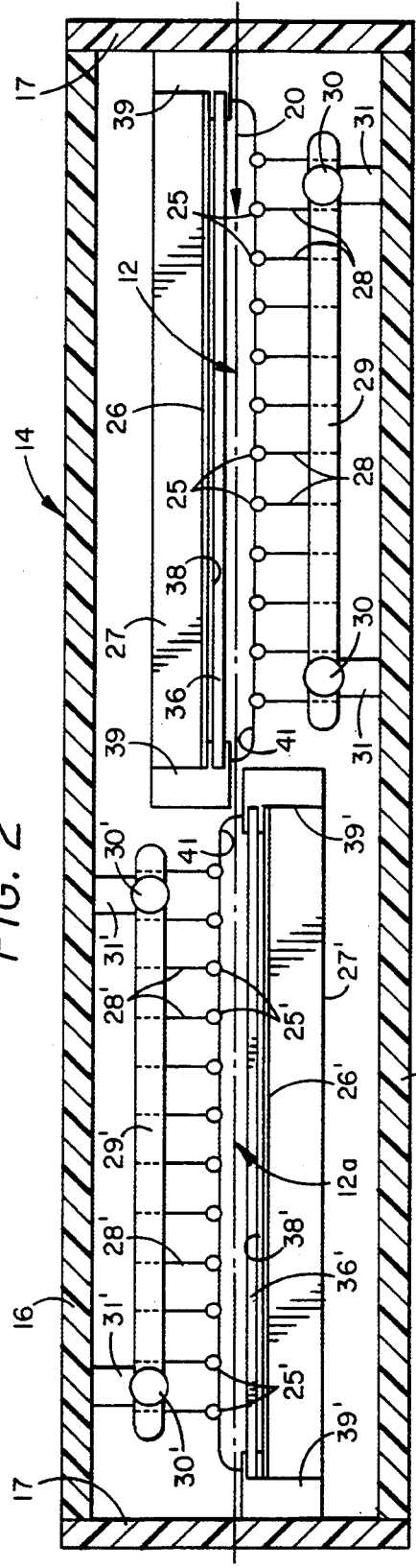

METHOD OF CONTROLLING HIGH-FREQUENCY ARC DISCHARGE AND APPARATUS FOR TREATMENT OF OUTER SURFACES OF MOLDED POLYMER PARTS WITH ELECTRICAL DISCHARGE

FIELD OF THE INVENTION

The present invention relates generally to the treatment of surfaces of polymer materials with low surface energy, such as polyethylene or polypropylene, and more particularly, to a method and apparatus for treating surfaces of articles made of such materials so that the surfaces have enhanced printing ink adhesion characteristics.

BACKGROUND OF THE INVENTION

In the medical field, for example, the tubular form is common to a variety of medical devices. Graduation scales, warning messages and other information often must be printed on syringe barrels, pipettes, pipette tips, needle shields and the like. Since these devices commonly are made of polypropylene, ink will not adequately adhere without prior surface treatment of the device. Moreover, since the devices are cylindrical, round, or otherwise multi-surfaced, the entire circumferential or perimeter surface must be treated. Because of the large numbers of such devices which commonly are manufactured in commercial production, it also is necessary that such treatment be carried out on a continuous and substantially automated basis.

It is known to treat the surfaces of such plastic devices by plasma existing in the high impedance, high frequency arc discharge generated between two electrodes located on opposite sides of the treated surface. One form of such surface treatment apparatus is disclosed in U.S. Pat. No. 4,724,508 wherein formed plastic articles are successively directed between a plurality of pairs of specifically configured insulated electrodes. A peripheral surface of the article directed between each pair of electrodes is circumscribed by a charged field which causes a chemical modification of the surface. The use of bare metal electrodes, however advantageous, is not possible in such surface treatment devices because the high temperature spark propagated between the two electrodes will cause the article to melt. Special insulation on one or both electrodes typically is used to moderate the arc and prevent overheating and melting of the plastic material. Quartz glass typically is used as the insulator for the electrode because it is the only effective insulative material that can be economically formed about electrodes of such shape. Stress concentrations in the curved corners of the electrodes result in higher operating temperatures and ultimate periodic cracking and failure, which in turn creates costly down time in the operation of the equipment. In order to reduce such overheating and failure of the electrode insulation in devices of such type, provision must be made for directing cooling air across the electrodes, which increases the complexity and cost of the equipment. Even then, insulation failure is common in such devices. In addition, the direction of cooling air across the electrodes tends to force toxic ozone out of the treatment zone, and in order to prevent such occurrence and to satisfy OSHA requirements, relatively large capacity exhaust equipment must be employed to remove the ozone, further increasing the cost of the equipment.

Another known method for treating surfaces of formed plastic articles utilizes a plurality of baremetal, discharge electrodes each disposed in close proximity to a metal electrode formed as a plate or other generally flat shaped surface. The discharge electrodes are aligned in spaced relationship to the flat electrode so that a zone of treatment is established therebetween. The flat electrode is covered with a dielectric material such as plastic, quartz, ceramic or silicone to prevent sparking or high temperature arcing between the electrodes which would cause melting of the treated articles. Such insulation may have a flat shape and hence is relatively easy to manufacture. As each article is passed through the treatment zone defined by the discharge electrode and the flat electrode, a peripheral surface of the article is partially circumscribed by the discharge with resulting molecular modification.

A problem with such bare discharge electrode surface treatment systems is that the discharge does not fully cover the entire circumferential surface of the articles being treated. Treatment of the complete circumference of a cylindrical device necessitates rotating the device 180 degrees and redirecting it through the treatment zone, which requires additional costly handling of the parts and limits the production capacity of the treatment system. Attempts to overcome such problems by increasing the intensity of the discharge has led to excessive heat generation and melting of the treated items, especially when the speed of travel through the treatment zone should be slowed or interrupted. While intensity of the discharge can be controlled by insulation, the thicker the insulation the more difficult and costly it is to manufacture. Moreover, dielectrics with good heat dissipation characteristics and with sufficient dielectrics strength against high voltage breakdown, such as silicone, quartz glass and ceramic, all have high dielectric constants, and hence, may not sufficiently reduce the intensity of the charge. Furthermore, the discharge from such bare metal discharge electrodes is difficult to control. As the electrodes are energized, the discharging arc progresses to relatively high intensity upon a relatively small increase in operating voltage. The discharges of adjacent bare discharge electrodes also tend to compete with each other, altering the discharges of the electrodes and further making it difficult to control the intensity and uniformity of the electrical field in the treatment zone.

OBJECTS AND SUMMARY OF THE INVENTION

It is an object of the present invention to provide a surface treatment method and apparatus adapted for more reliably and efficiently treating the entire circumferential surface of tubular or other configured plastic articles.

Another object is to provide a surface treatment method and apparatus as characterized above which substantially eliminates down time by virtue of electrode failure. A related object is to provide such a surface treatment method and apparatus which utilizes inexpensive and relatively long lasting electrodes.

Still another object is to provide a surface treatment method and apparatus of the foregoing type which does not require forced air cooling of the electrodes, nor the expense and complexity associated therewith.

Another object is to provide such a surface treatment method and apparatus which has improved control in the uniformity in the electrode discharges.

Yet another object is to provide a surface treatment apparatus of such type which is relatively simple in construction and which lends itself to more economical manufacture and use.

Other objects and advantages of the invention will become apparent upon reading the following detailed description and upon reference to the drawings, in which:

BRIEF DESCRIPTION OF THE DRAWINGS

FIG. 2 is a side elevation view, partially broken away, depicting the illustrated surface treatment apparatus;

FIG. 3 is a vertical section of the illustrated apparatus, taken in the plane of line 3—3 in FIG. 2.

DESCRIPTION OF THE PREFERRED EMBODIMENTS

Figure 4:
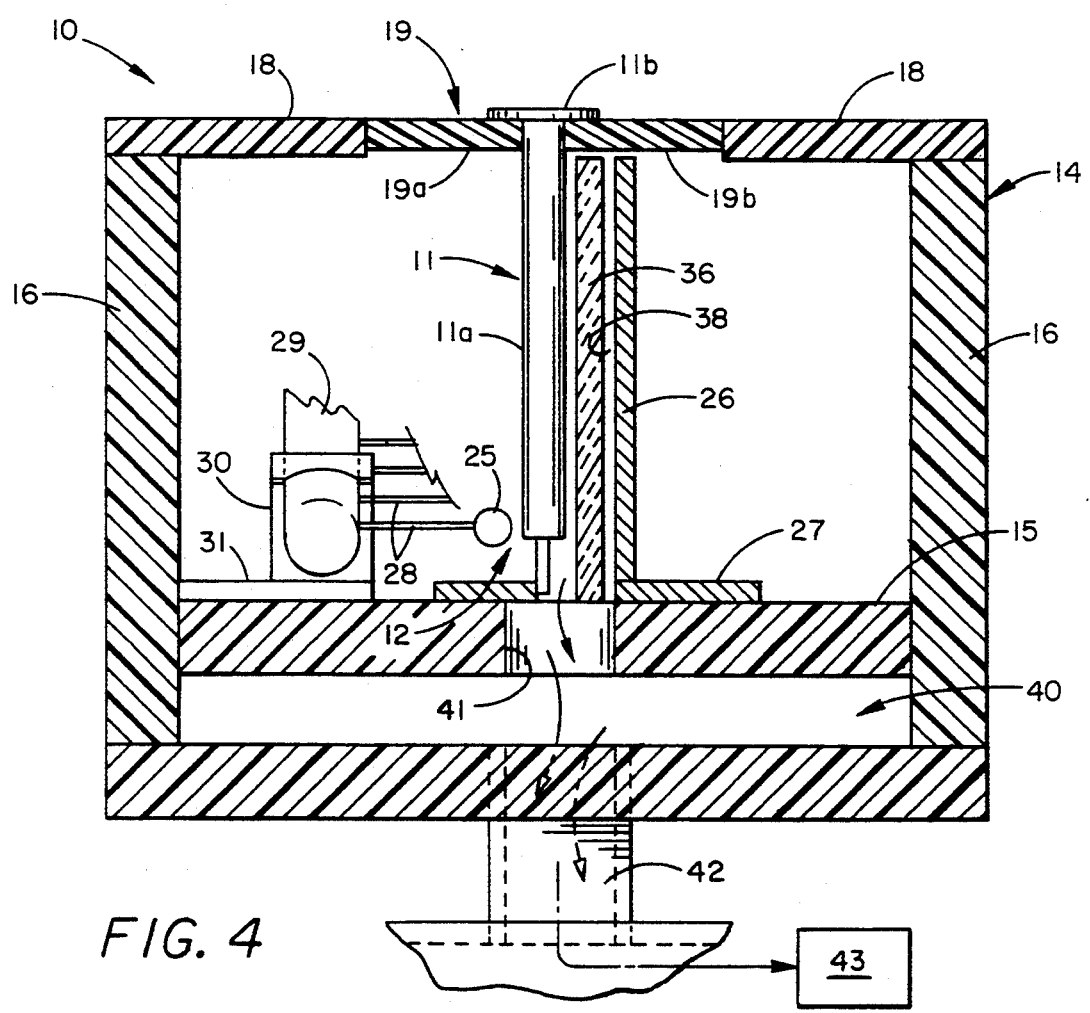
FIG. 4 is an enlarged section of the illustrated apparatus taken in the plane of line 4—4 in FIG. 2.

Referring now more particularly to the drawings, there is shown an illustrative surface treatment apparatus 10 embodying the present invention adapted for successively treating the surfaces of formed plastic articles 11 (see FIG. 4). The articles 11 in this case are syringe barrels having a tubular body portion 11a and a transverse flange 11b at the upper end thereof. It will be understood that various other forms of plastic articles 11 may be treated by the apparatus 10, including articles of different configurations and geometric shape such as packages, containers, tubes, pipe, barrels and the like, the shape of the article being regular or irregular and having an outside surface to be treated made of polymer. Any polymer surface which is subject to molecular modification as a-result of electrical discharge treatment may be utilized with the invention. Polypropylene, polyethylene, and polystyrene are representative polymers.

The illustrated apparatus 10 has an elongated plastic housing 14 defined by a base 15, side and end walls 16, 17, and partial top walls 18 extending inwardly from the side walls 16. For transporting articles 11 successively along the apparatus 10, a vibratory guide rail conveyor 19 (FIG. 4) extends the length of the apparatus centrally between the top walls 18. The conveyor 19 includes a pair of guide rails 19a, 19b separated by a spacing such that the plastic articles 11 each can be suspended on the guide rails 19a, 19b by the flange 11b with the tubular body portion 11a of the article disposed in depending fashion within the housing 14. The guide rails 19a, 19b may be vibrated in a known manner to move the articles progressively along the length of the apparatus in a downstream direction as indicated by the arrow 20.

For creating an electrical discharge for treating externally exposed surfaces of the tubular body portions 11a of the articles 11 directed along the housing 14, a plurality of bare metal, non-insulated, discharge electrodes 25 are provided at longitudinally spaced intervals and in laterally spaced relation to and a metal counter-electrode 26. While the discharge electrodes 25 can take a variety of shapes, in the illustrated embodiment the discharge electrodes 25 each are in the form of a sphere mounted on a thin metal stem 28. The diameter of the spherical electrode 25, which preferably is as least 3 times the diameter of the stem 28, typically may be between about 1 to 10 millimeters, and preferably between about 4 to 6 millimeters.

For supporting the electrodes 25, the stems 28 thereof are mounted on a common bus bar 29. The bus bar 29 is supported at its opposite ends by stand offs 30, which in turn are secured to the housing 14 by mounting brackets 31. The bus bar 29 in this instance is supported at an angle to the horizontal, as shown in FIG. 2, with its downstream end 29b being higher than its upstream end 29a such that the discharge electrodes 25 are progressively disposed at higher elevations along a downstream direction. The bus bar is connected to a high voltage power supply 35 (see FIG. 1) capable of providing a high voltage AC output of between 10 and 60 kilovolts R.M.S. at a frequency of between 15 and 40 kHz.

The counterelectrode 26 in this case is a flat metal plate which extends the length of the row of longitudinally spaced discharge electrodes 25. The counterelectrode 26 has a mounting plate 27 on a side opposite that of the discharge electrodes, which may be secured to the base 15 of the housing 14 by appropriate fasteners. While the counterelectrode 26 is shown as a single elongated plate, it will be understood that alternatively a plurality of counterelectrodes could be utilized each being associated with a respective electrode.

The counterelectrode 26 is mounted in laterally spaced relation to the discharge electrodes 25 so as to define a treatment zone 12 therebetween through which the articles may be directed for surface treatment. As is known in the art, connecting the bus bar 29 to the high frequency, high voltage power supply 35 will create a high intensity electrical field between the discharge electrodes and the counterelectrode in the form of high frequency arcs.

In accordance with an important aspect of the invention, an insulation layer 36 having a high dielectric constant and heat dissipation characteristics is provided in spaced relation to the counterelectrode 26 to define a predetermined air space 38 between the counterelectrode and insulation layer for (1) moderating the electrical discharges in the air gap between the discharge electrodes and the insulated counterelectrode, (2) permitting greater control in the intensity of the discharges, and (3) minimizing adverse competing effects of adjacent discharge electrodes and thereby further enhancing the uniformity and control of the electrical fields in the treatment zone. The insulation layer 36 preferably has a simple flat sheet-like shape held in position by end support members 39 as illustrated so as to permit economical production and use. The dielectric insulation should have a dielectric constant greater than 2 and preferably in the range of between about 6 and 10. The insulation layer also should be resistant to ozone and electrical arcing and adapted to dissipate large amounts of heat without breakage, burning or alteration of shape. Typical insulation materials would include plastic, quarts, ceramic and silicon. The air gap 38 between the insulation layer 36 and the counterelectrode 26 can vary from 2 to 30 mm., and preferably is in the range of from about 5 to 10 mm.

The spacial separation between the insulation layer 36 and the counterelectrode 26 has been found to significantly enhance the control and uniformity of the discharges between the discharge electrodes 25 and the counterelectrode 26. Specifically, the discharge can be controlled within a lower intensity range than heretofore possible with bare electrode surface treatment devices, wherein the discharging arc typically progressed to relatively high intensity upon a relatively small increase in operating voltage. The air gap 38 between the insulation layer and the counterelectrode 26 also has been found to substantially eliminate the erratic competing effect of one discharge electrode on the discharge arc of adjacent electrodes, thereby further enabling substantially uniform and more controllable discharging arcs in the treatment zone. Moreover, it will be understood by one skilled in the art that further control of the electrical discharges of the electrodes can be achieved by adjustably mounting the insulation layer 36 relative to the counterelectrode 26, thereby enabling establishment of the desired air gap. It will further be appreciated that such improved control is achieved without the necessity for use of thick insulation which would increase the cost and complexity of the apparatus The electrode insulation layer 36, furthermore, is adapted for long lasting, failure free usage without the necessity for forced air cooling, and the cost and complexities associated therewith.

For enabling the removal of toxic ozone generated within the treatment zone during operation of the apparatus 10, the base 15 in this instance is formed with an exhaust manifold 40 having an elongated upwardly opening inlet 41 extending the length of the treatment zone and an outlet 42 communicating with an appropriate exhaust fan or pump 43c (shown schematically in FIG. 4). Since there is no necessity for exhausting the large air flows generated by conventional forced air cooling of electrode insulation, the capacity of the vacuum pump may be smaller and less expensive and the risk of discharge of toxic ozone into the outside environment by reason of cooling blowers is eliminated.

Figure 1:
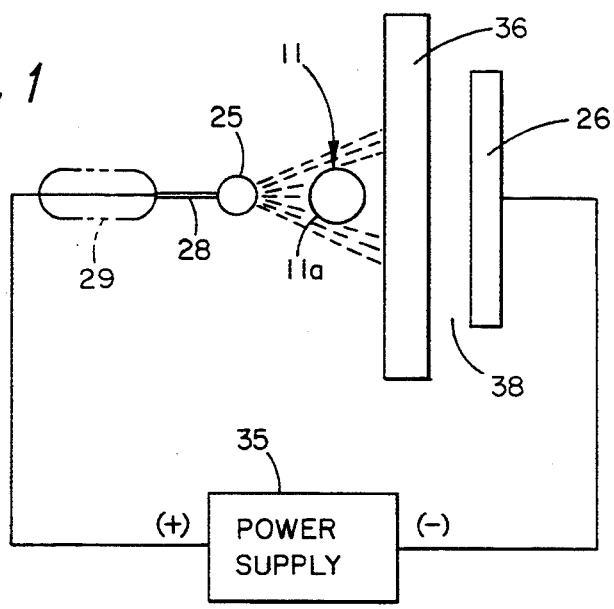
FIG. 1 is a diagrammatic depiction of a surface treatment apparatus according to the present invention.

In operation of the treatment apparatus, it will be understood by one skilled in the art that as articles 11 are conveyed through the treatment zone 12 defined between the discharge electrodes 25 and the counterelectrode 26, the high frequency, high voltage discharge between each discharge electrode and the insulated counterelectrode will circumscribe at least 180 degrees around the peripheral surface of the tubular portion of the article 11 on side adjacent the discharge electrode (FIG. 1). Since the discharge electrodes 25 are progressively disposed at higher elevations to each other the discharges of successive discharge electrodes 25 will progressively treat the tubular portion 11a of the article from bottom to top of the tubular portion as the article is directed past the discharge electrodes. Because of the enhanced control of the intensity and uniformity of the discharges from the electrodes, the peripheral surface will be uniformly treated and molecularly modified such that the surface has increased and relatively uniform surface adhesion characteristics and surface wetting tension. Upon the article passing the last of the discharge electrodes 25, the half of the circumferential peripheral surface along the entire length of the tubular portion 11a is treated.

In carrying out a further aspects of the invention, the treatment apparatus 10 includes a second treatment zone 12a having a series of electrodes 25' located on a side of the housing 10 opposite that of the first discharge electrodes 25 for treating the opposite circumferential side of the tubular portions 11a of the articles as they continue to be directed, as indicated by the arrow 20, within the housing 14, thereby completing the treatment of the entire circumferential surface of the tubular portion of the articles without the necessity for rotating or redirecting the articles through the apparatus. It can be seen that the electrodes 25' are identical to those previously described and are similarly mounted on a common bus bar 29', which in turn is supported on the base 15 of the housing by stand offs. The bus bar 29' in this case is supported with its upstream end at a higher elevation than the downstream end such that upon energization of the discharge electrodes 25' the opposite side of the tubular body portion is progressively treated from top to bottom.

Supported in spaced relation to the discharge electrode 25' is a counterelectrode 26', similar to that previously described, and a flat plate or sheet-like insulation layer 36' is supported in parallel spaced relation to the counterelectrode for defining an air gap 38' therebetween. The discharge electrodes 25' and counterelectrode 26' are located in longitudinal alignment to the counterelectrode 26 and first set of discharge electrodes 25, respectively, downstream thereof such that as the articles are moved along the vibratory conveyor 19, they are immediately directed between the second set of discharge electrodes 25' and the second counterelectrode 26' for completing treatment of the circumferential side of the tubular body portions 11a adjacent the second set of electrodes. It will be understood by one skilled in the art that the articles may be transferred along the conveyor at rates comparable to the production and/or printing of the articles, thereby enabling the surface treatment apparatus to be part of an automated manufacturing system.

From the foregoing, it can be seen that the surface treatment method and apparatus of the present invention is adapted for reliable and efficient treatment of the entire circumferential surfaces of plastic articles with improved electrode discharge control. The apparatus utilizes inexpensive and relatively long lasting electrodes which substantially eliminate down time by virtue of electrode failure. Nor does the apparatus require the necessity for forced air cooling of the electrodes, nor the expense and complexity associated therewith.

What is claimed is:

1. An apparatus for the surface treatment of formed plastic articles comprising:
   at least one pair of electrodes;
   means for mounting said electrodes in spaced apart relation for defining a treatment zone therebetween for the passage of articles to be treated;
   said electrodes including a bare metal discharge electrode and a metal counterelectrode;
   means for connecting said discharge electrode to a high frequency AC power supply for creating a high frequency electrical discharge between said electrodes,
   a dielectric insulation; and
   means mounting said insulation in spaced relation to said counterelectrode such that a discrete air space exists between said insulation and counterelectrode.

2. The surface treatment apparatus of claim 1 including means for moving said articles through said treatment zone.

3. The surface treatment apparatus of claim 1 including a plurality of discharge electrodes each mounted in spaced relation to each other in the direction of movement of said articles.

4. The surface treatment apparatus of claim 3 in which said counterelectrode comprises a flat metal plate extending the length of said plurality of discharge electrodes, and said insulation has a substantially flat shape and is mounted in parallel relation to said flat counterelectrode plate.

5. The surface treatment apparatus of claim 3 in which said discharge electrodes each are in the form of a sphere mounted on a respective stem, and said stems for said plurality of electrodes are mounted on a common bus bar.

6. The surface treatment apparatus of claim 5 in which said bus bar is mounted at an incline to the horizontal such that said discharge electrodes each are disposed at a predetermined different elevation.

7. The surface treatment apparatus of claim 1 in which said dielectric insulation has a dielectric constant greater than 2.

8. The surface treatment apparatus of claim 7 in which said insulation is spaced from said counterelectrode to define an air gap of between about 2 and 20 millimeters.

9. The surface treatment apparatus of claim 7 in which said insulation is spaced from said counterelectrode to define an air gap of between about 4 and 10 millimeters.

10. The surface treatment apparatus of claim 1 in which said dielectric insulation has a dielectric constant of between about 6 and 10.

11. An apparatus for the surface treatment of formed plastic articles comprising:
   a first set of longitudinally spaced discharge electrodes,
   at least one first counterelectrode disposed in laterally spaced relation to the discharge electrodes of said first set for defining a treatment zone therebetween,
   an first dielectric insulation adjacent said at least one first counterelectrode,
   means for connecting the discharge electrodes of said first set to a high frequency AC power supply for creating a high impedance electrical discharge between the discharge electrodes of said first set and said at least one first counterelectrode,
   a second set of longitudinally spaced discharge electrodes,
   at least one second counterelectrode disposed in laterally spaced relation to the discharge electrodes of said second set for defining a second treatment zone therebetween,
   a second dielectric insulation adjacent said at least one second counterelectrode,
   means for connecting the discharge electrodes of said second set to a high frequency AC power supply for creating a high frequency electrical discharge between the discharge electrodes of said second set and said at least one second counterelectrode, and
   means for moving said formed plastic articles through said first treatment zone for treating at least one half of the circumferential surface thereof on a side adjacent the discharge electrodes of said first set and thereupon continuing to move said articles through said second treatment zone without rotation thereof for treating at least one half of the circumferential surface thereof on a side adjacent the discharge electrodes of said second set.

12. The surface treatment apparatus of claim 11 in which said moving means moves said articles in a straight line through said first and second treatment zones.

13. The surface treatment apparatus of claim 12 in which said second set of discharge electrodes are on a side of the path of travel of said articles opposite of that of said first set of discharge electrodes.

14. The surface treatment apparatus of claim 11 in which said first dielectric insulation is mounted in spaced relation to said at least one first counterelectrode such that a discreet air space exists between said first dielectric insulation and said at least one first counterelectrode; and said second dielectric insulation is mounted in spaced relation to said at least one second counterelectrode such that a discreet air space exists between said second dielectric insulation and said at least one second electrode.

15. The surface treatment apparatus of claim 14 in which said first and second dielectric insulations each have a dielectric constant greater than 2, and said first and second insulations each are mounted in spaced relation to the respective counterelectrode to define an air gap of between about 2 and 20 mm. with respect thereto.

16. The surface treatment apparatus of claim 11 in which the discharge electrodes of said first set are mounted at progressively higher elevations with respect to each other and the direction of movement of an article through said first treatment zone and said discharge electrodes of said second set are mounted at progressively lower elevations with respect to each other in the direction of movement of articles of said second treatment zone.

17. A method of controlling a high-frequency arc discharge between at least one pair of electrodes by controlling the impedance of the discharge path comprising:
   placing the said electrodes in a close proximity for defining a treatment zone therebetween;
   locating a dielectric insulation adjacent the surface of one of the electrodes;
   establishing a high-frequency high intensity electrical field between the electrodes to initiate and sustain an electrical discharge arc;
   establishing an air gap between the insulation and adjacent one electrode smaller than the distance between the insulation and the other electrode; and
   varying the width of the air gap between said insulation and one electrode to achieve the desirable intensity of the electrical discharge arc.

18. The method of claim 17 including varying the width of said gap between about 0.5 mm and 30 mm.

19. The method of claim 17 including varying the width of said gap between about 5 mm and 10 mm.

20. The method of claim 18 including applying a high voltage AC signal between said electrodes of between 10 and 60 kHz.

* * * * *